US010220564B2

(12) United States Patent
Nauka et al.

(10) Patent No.: US 10,220,564 B2
(45) Date of Patent: Mar. 5, 2019

(54) GENERATING THREE-DIMENSIONAL OBJECTS

(71) Applicant: Hewlett-Packard Development Company, L.P., Houston, TX (US)

(72) Inventors: Krzysztof Nauka, Palo Alto, CA (US); Esteve Comas, Sant Quirze del Valles (ES); Alejandro Manuel De Pena, Sant Cugat del Valles (ES); Howard S. Tom, San Jose, CA (US); Hou T. Ng, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 318 days.

(21) Appl. No.: 15/110,754

(22) PCT Filed: Jan. 31, 2014

(86) PCT No.: PCT/US2014/014044
§ 371 (c)(1),
(2) Date: Jul. 11, 2016

(87) PCT Pub. No.: WO2015/108546
PCT Pub. Date: Jul. 23, 2015

(65) Prior Publication Data
US 2016/0332374 A1    Nov. 17, 2016

(30) Foreign Application Priority Data
Jan. 16, 2014  (WO) ................ PCT/EP2014/050841

(51) Int. Cl.
B29C 64/00    (2017.01)
B29C 64/165   (2017.01)
(Continued)

(52) U.S. Cl.
CPC ............ B29C 64/00 (2017.08); B29C 64/165 (2017.08); B29C 64/386 (2017.08); B29C 64/40 (2017.08);
(Continued)

(58) Field of Classification Search
CPC ....................................... B29C 64/00
See application file for complete search history.

(56) References Cited

U.S. PATENT DOCUMENTS 6,589,471 B1   7/2003   Khoshnevis
6,799,959 B1   10/2004  Tochimoto et al.
(Continued)

FOREIGN PATENT DOCUMENTS

CN    1065239     10/1992
CN    1204277     1/1999
(Continued)

OTHER PUBLICATIONS

International Search Report and Written Opinion for International Application No. PCT/US2014/014044 dated Aug. 28, 2015, 11 pages.
(Continued)

*Primary Examiner* — Larry W Thrower
(74) *Attorney, Agent, or Firm* — HP Inc. Patent Department

(57) ABSTRACT

A three-dimensional object may be generated. Energy may be applied to a layer of build material to cause a first portion of the layer to coalesce and solidify in a first pattern. A cooling agent may be selectively delivered on a second portion of the layer of the build material to reduce a temperature of the second portion in a second pattern, the first and second patterns being independent of each other.

16 Claims, 4 Drawing Sheets

(51) Int. Cl.
  *B29C 64/386* (2017.01)
  *B33Y 10/00* (2015.01)
  *B33Y 30/00* (2015.01)
  *B29C 35/16* (2006.01)
  *B29C 64/40* (2017.01)

(52) U.S. Cl.
  CPC ....... *B29C 2035/1616* (2013.01); *B33Y 10/00* (2014.12); *B33Y 30/00* (2014.12)

(56) References Cited

U.S. PATENT DOCUMENTS

| | | |
|---|---|---|
| 7,537,722 B2 | 5/2009 | Andersson |
| 7,958,841 B2 | 6/2011 | Kritchman et al. |
| 9,421,715 B2 | 8/2016 | Hartmann et al. |
| 2002/0020945 A1 | 2/2002 | Cho et al. |
| 2004/0200816 A1 | 10/2004 | Chung et al. |
| 2005/0001356 A1 | 1/2005 | Tochimoto et al. |
| 2005/0104241 A1 | 5/2005 | Kritchman et al. |
| 2006/0091842 A1 | 5/2006 | Nishiyama |
| 2006/0244169 A1 | 11/2006 | Monsheimer et al. |
| 2007/0238056 A1 | 10/2007 | Baumann et al. |
| 2007/0241482 A1 | 10/2007 | Giller et al. |
| 2011/0241240 A1 | 10/2011 | Gothait |
| 2012/0201960 A1 | 8/2012 | Hartmann et al. |
| 2012/0231175 A1 | 9/2012 | Tan |
| 2013/0186549 A1 | 7/2013 | Comb et al. |
| 2013/0220572 A1 | 8/2013 | Rocco et al. |

FOREIGN PATENT DOCUMENTS

| | | |
|---|---|---|
| CN | 1500608 | 6/2004 |
| CN | 101076550 | 11/2007 |
| CN | 103338881 | 10/2013 |
| EP | 1466718 | 10/2004 |
| JP | 2004114685 | 4/2004 |
| JP | 2004306612 | 4/2004 |
| JP | 2006183146 | 7/2006 |
| JP | 2007-021747 | 2/2007 |
| WO | WO-2006091842 | 8/2006 |
| WO | WO 2013140147 A1 | 9/2013 |

OTHER PUBLICATIONS

Rajon, D. et al., An investigation of the potential of rapid prototyping technology for image-guided surgery, Jrnl. of Applied Clinical Medical Physics vol. 7 No. 4 (2006) 19pgs.

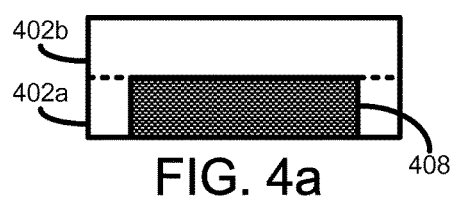
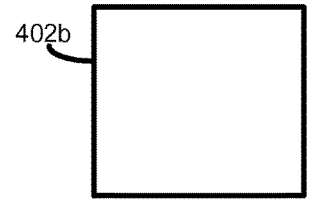
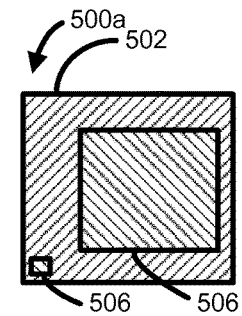
FIG. 4a                FIG. 5a                FIG. 6a
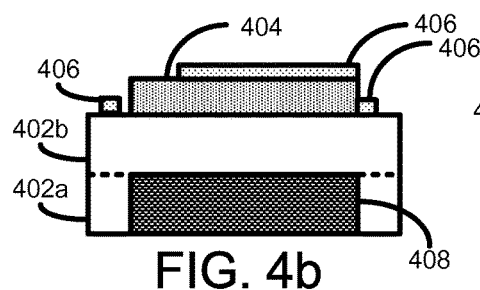
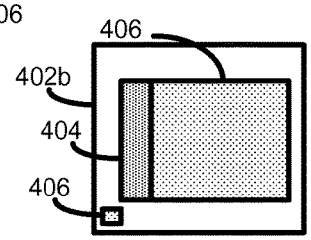
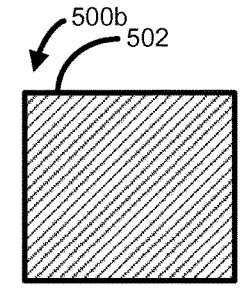
FIG. 4b                FIG. 5b                FIG. 6b
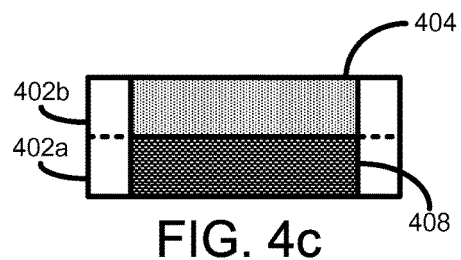
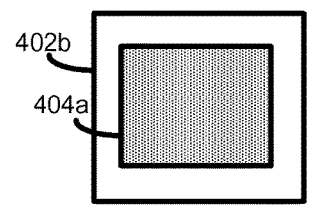
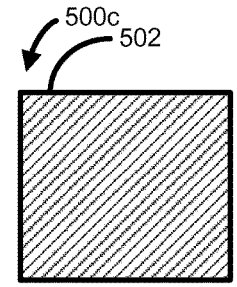
FIG. 4c                FIG. 5c                FIG. 6c
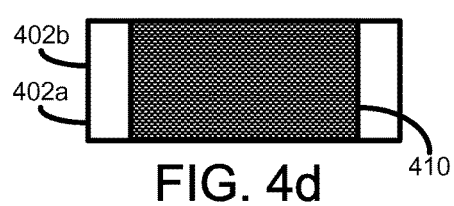
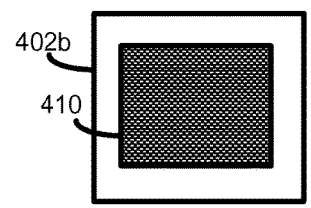
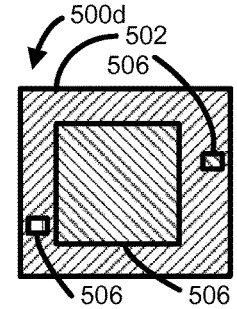
FIG. 4d                FIG. 5d                FIG. 6d

GENERATING THREE-DIMENSIONAL OBJECTS

BACKGROUND

Additive manufacturing systems that generate three-dimensional objects on a layer-by-layer basis have been proposed as a potentially convenient way to produce three-dimensional objects in small quantities.

The quality of objects produced by such systems may vary widely depending on the type of additive manufacturing technology used. Generally, low quality and low strength objects may be producible using lower cost systems, whereas high quality and high-strength objects may be producible using higher cost systems.

BRIEF DESCRIPTION

Some examples are described with respect to the following figures.

Figure 1:
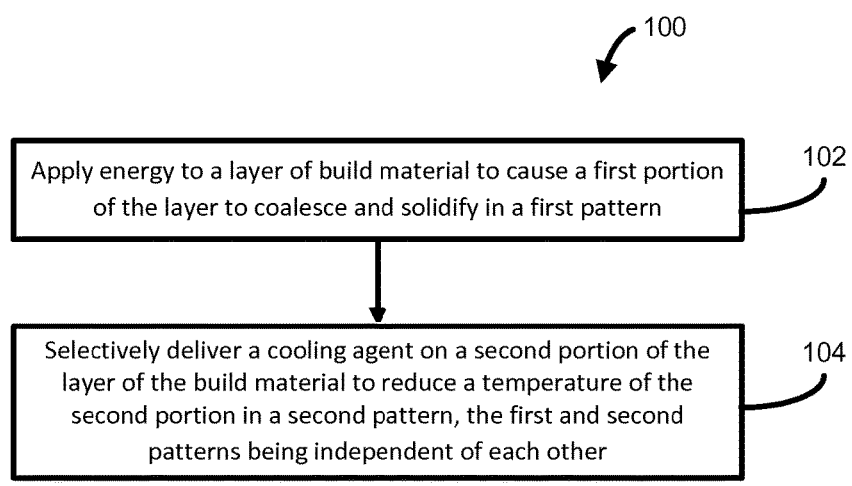
FIG. 1 is a flow diagram illustrating a method of generating a three-dimensional object according to some examples.

FIGS. 4a-d show a series of cross-sectional side views of layers of build material according to some examples;

FIGS. 5a-d show a series of top views of the layers of build material of FIGS. 4a-d according to some examples; and FIGS. 6a-d show a series of schematic top views of temperature distributions in the layers of build material of FIGS. 4a-d according to some examples.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Additive manufacturing techniques may generate a three-dimensional object through the solidification of portions of one or more successive layers of build material. The build material can be powder-based and the properties of generated objects are dependent on the type of build material and the type of solidification mechanism used.

Object properties may depend on the nature of the build materials used, the processes by which build material is solidified to form a desired three-dimensional object, and temperatures of build materials during such processes. Such properties may include, for example, surface roughness, accuracy, and strength.

A coalescing agent is a material that, when a suitable amount of energy is applied to a combination of build material and coalescing agent, may cause the build material to coalesce and solidify. However, in some examples, energy absorbed by build material on which coalescing agent has been delivered or has penetrated may also propagate into surrounding build material. The energy may be sufficient to cause surrounding build material to heat up. For example, the energy may propagate laterally through the build material, beneath the current layer, and/or into a future layer once it is applied on the newest layer. This effect may be exacerbated when using build materials that may have relatively low heat conductivity, as this may cause a heat reservoir to be formed beneath the surface of each newly created layer as it is formed. The heat in the reservoir may then slowly propagate laterally across the build material, below the newest layer, and/or into a future layer once it is applied on the newest layer.

Thus, the build material may be heated to a temperature suitable to cause softening and bonding of build material. This temperature could be above or below the material melting point. This may result in the subsequent solidification of portions of the build material that were not intended to be solidified and this effect is referred to herein as coalescence bleed. Coalescence bleed may result, for example, in a reduction in the overall accuracy of generated three-dimensional objects. For example, deformations may include three-dimensional portions such as a deformation extending laterally from the sides of the object, and a deformation extending below from the bottom of the object. Deformations may also include smaller irregularities in solidification due to undesired temperature distributions or heat conduction effects across the build material.

Accordingly, the present disclosure may allow three-dimensional objects to be created in which the effects of coalescence bleed may be reduced by delivering cooling agent on appropriate portions of build material. In some examples, the cooling agent may be applied to selected portions of a layer of build material. This may allow excess heat to be dispersed causing the layer of build material to have a temperature distribution that matches a predetermined target temperature distribution, for example a uniform or substantially uniform temperature distribution. This may reduce the degree of coalescence of a portion of build material on which the cooling agent has been delivered.

FIG. 1 is a flow diagram illustrating a method of generating a three-dimensional object according to some examples. At block 102, energy may be applied to a layer of build material to cause a first portion of the layer to coalesce and solidify in a first pattern. At block 104, a cooling agent may be selectively delivered on a second portion of the layer of the build material to reduce a temperature of the second portion in a second pattern, the first and second patterns being independent of each other. The cooling agent may be delivered before or after applying the energy, for example.

Figure 2A:
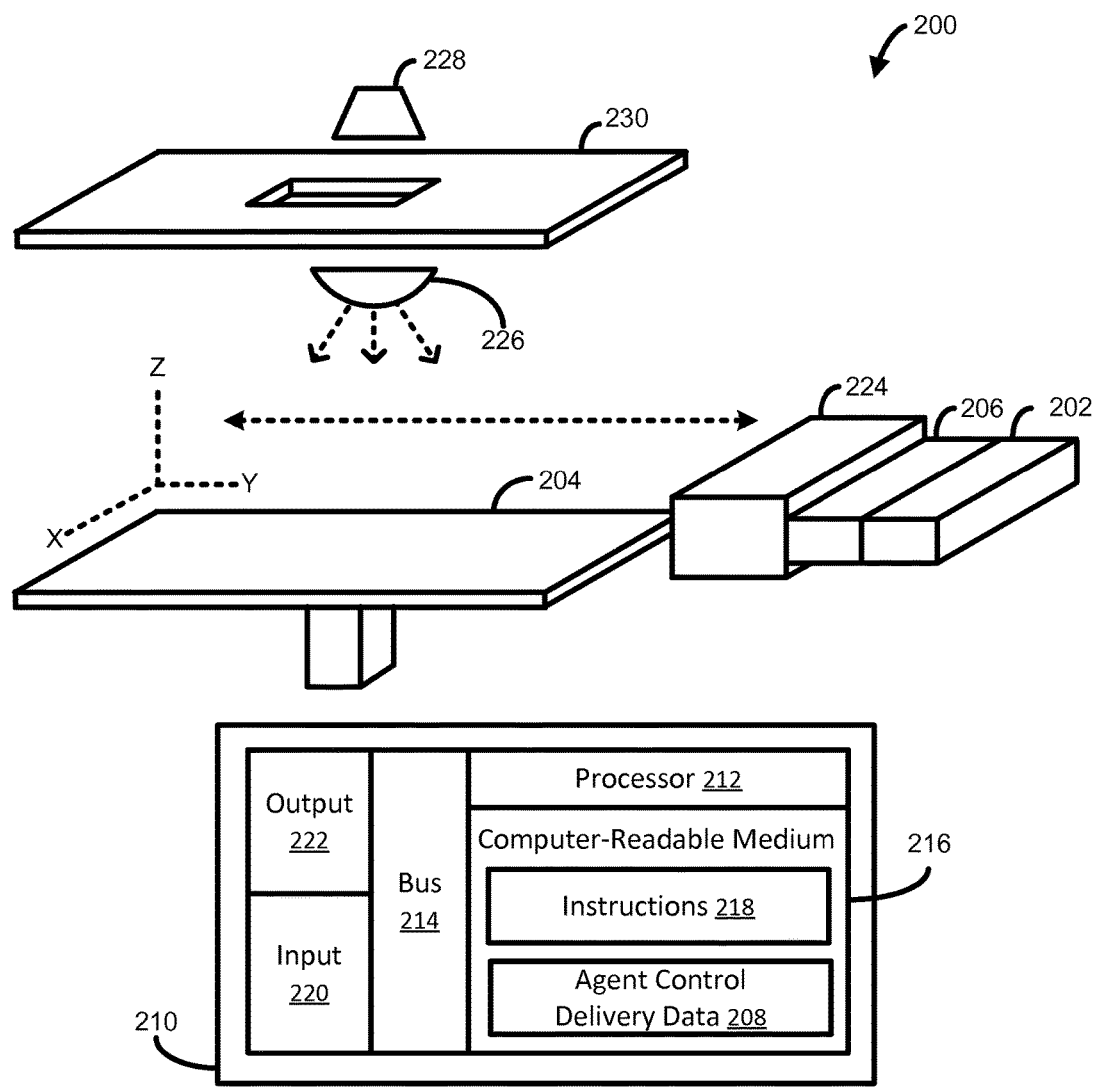
FIG. 2a is a simplified isometric illustration of an additive manufacturing system according to some examples.

FIG. 2a is a simplified isometric illustration of an additive manufacturing system 200 according to some examples. The system 200 may be operated, as described further below with reference to the flow diagram of FIG. 3, to generate a three-dimensional object.

In some examples the build material may be a powder-based build material. As used herein the term powder-based materials is intended to encompass both dry and wet powder-based materials, particulate materials, and granular materials. In some examples, the build material may include a mixture of air and solid polymer particles, for example at a ratio of about 40% air and about 60% solid polymer particles. One suitable material may be Nylon 12, which is available, for example, from Sigma-Aldrich Co. LLC. Another suitable Nylon 12 material may be PA 2200 which is available from Electro Optical Systems EOS GmbH. Other examples of suitable build materials may include, for example, powdered metal materials, powdered composited materials, powder ceramic materials, powdered glass materials, powdered resin material, powdered polymer materials, and the like, and combinations thereof. It should be understood, however, that the examples described herein are not limited to powder-based materials or to any of the materials listed above. In other examples the build material may be a paste or a gel. According to one example a suitable build material may be a powdered semi-crystalline thermoplastic material. Some materials may have a low heat conductivity, resulting in increased risk of coalescence bleed. For example some nylons may have a heat conductivity of about 0.1 W/m K at room temperature and about 0.2 W/m K at its melting point.

The additive manufacturing system 200 may include a system controller 210. Any of the operations and methods disclosed herein may be implemented and controlled in the additive manufacturing system 200 and/or controller 210.

The controller 210 may include a processor 212 for executing instructions such as those described in the methods herein. The processor 212 may, for example, be a microprocessor, a microcontroller, a programmable gate array, an application specific integrated circuit (ASIC), a computer processor, or the like. The processor 212 may, for example, include multiple cores on a chip, multiple cores across multiple chips, multiple cores across multiple devices, or combinations thereof. In some examples, the processor 212 may include at least one integrated circuit (IC), other control logic, other electronic circuits, or combinations thereof.

The controller 210 may support direct user interaction. For example, the additive manufacturing system 200 may include user input devices 220 coupled to the processor 212, such as one or more of a keyboard, touchpad, buttons, keypad, dials, mouse, track-ball, card reader, or other input devices. Additionally, the additive manufacturing system 200 may include output devices 222 coupled to the processor 212, such as one or more of a liquid crystal display (LCD), printer, video monitor, touch screen display, a light-emitting diode (LED), or other output devices. The output devices 222 may be responsive to instructions to display textual information or graphical data.

The processor 212 may be in communication with a computer-readable storage medium 216 via a communication bus 214. The computer-readable storage medium 216 may include a single medium or multiple media. For example, the computer readable storage medium 216 may include one or both of a memory of the ASIC, and a separate memory in the controller 210. The computer readable storage medium 216 may be any electronic, magnetic, optical, or other physical storage device. For example, the computer-readable storage medium 216 may be, for example, random access memory (RAM), static memory, read only memory, an electrically erasable programmable read-only memory (EEPROM), a hard drive, an optical drive, a storage drive, a CD, a DVD, and the like. The computer-readable storage medium 216 may be non-transitory. The computer-readable storage medium 216 may store, encode, or carry computer executable instructions 218 that, when executed by the processor 212, may cause the processor 212 to perform any one or more of the methods or operations disclosed herein according to various examples. For example, the instructions may be to provide one or more control signals to the various components of the system 200 to perform the methods described herein.

The system 200 may include a coalescing agent distributor 202 to selectively deliver coalescing agent to successive layers of build material provided on a support member 204. According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. In one example such an ink may additionally comprise a UV light absorber. Examples of inks comprising visible light enhancers are dye based colored ink and pigment based colored ink, such as inks commercially known as CE039A and CE042A available from Hewlett-Packard Company.

The system 200 may also include a cooling agent distributor 206 to selectively deliver cooling agent to a layer of build material provided on the support member 204. A cooling agent may act to reduce temperature of build material where it is delivered, as will be discussed in more detail. In some examples, the cooling agent may be selected to have a boiling point below the build material's melting point. The build material's surface temperature may depend on whether it has undergone heating from the heater 230 and/or energy source 226. Thus, the cooling agent may be selected to have a temperature below the build material's surface temperature at the time the cooling agent is to be delivered, such that a thermal gradient may be created to allow heat to transfer to the cooling agent when it is delivered to the build material. In some examples, the cooling agent may be selected to have a suitable vapor pressure, suitable heat conductivity, and/or suitable vaporization enthalpy to cause fast heat transfer from the build material and subsequent vaporization.

In some examples, a fluid, such as a liquid, that exhibits a suitable cooling effect may be used as a cooling agent. In one example an agent comprising a high percentage of water has been demonstrated as a suitable cooling agent. In some examples, the cooling agent may be a water-based ink with no colorant. In some examples, polyethylene glycol may be used as a cooling agent. In other examples other types of cooling agent may be used.

In one example the support member 204 has dimensions in the range of from about 10 cm by 10 cm up to 100 cm by 100 cm. In other examples the support member 204 may have larger or smaller dimensions. The support member 204 may be a fixed part of the system 200, or may not be a fixed part of the system 200, instead being, for example, a part of a removable module.

The agent distributors 202 and 206 may be printheads, such as thermal printheads or piezo inkjet printheads. The printheads may have arrays of nozzles. In one example, printheads such as those commonly used in commercially available inkjet printers may be used. In other examples, the agents may be delivered through spray nozzles rather than through printheads. Other delivery mechanisms may be used as well.

The agent distributors 202 and 206 may be used to selectively deliver, e.g. deposit, coalescing agent and cooling agent when in the form of suitable fluids such as liquids. In some examples, the agent distributors 202 and 206 may be selected to deliver drops of agent at a resolution of between 300 to 1200 dots per inch (DPI), for example 600 DPI. In other examples the agent distributors 202 and 206 may be selected to be able to deliver drops of agent at a higher or lower resolution. In some examples, the agent distributors 202 and 206 may have an array of nozzles through which the agent distributors 202 and 206 are able to selectively eject drops of fluid. In some examples, the nozzle may be able to eject multiple drops in close succession at one or more locations. In some examples, each drop may be in the order of about 10 pico liters (pl) per drop, although in other examples agent distributors 202 and 206 that are able to deliver a higher or lower drop size may be used. In some examples agent distributors 202 and 206 that are able to deliver variable size drops may be used.

In various examples, the agent distributor 202 may be to deliver drops of coalescing agent that are larger than, smaller than, or the same size as drops of cooling agent delivered from the agent distributor 206.

In some examples the coalescing agent may comprise a liquid carrier, such as water or any other suitable solvent or dispersant, to enable it to be delivered via a printhead.

In some examples the printheads may be drop-on-demand printheads. In other examples the printheads may be continuous drop printheads.

In some examples, the agent distributors 202 and 206 may be an integral part of the system 200. In some examples, the agent distributors 202 and 206 may be user replaceable, in which case they may be removably insertable into a suitable agent distributor receiver or interface module of the system 200.

In some examples a single agent distributor, such as a printhead, may be used to selectively deliver both coalescing agent and cooling agent. For example, a first set of nozzles of the agent distributor may be configured to deliver coalescing agent, and a second set of nozzles of the agent distributor may be configured to deliver cooling agent.

In the example illustrated in FIG. 2a, the agent distributors 202 and 206 have a length that enables them to span the whole width of the support member 204 in a so-called page-wide array configuration. In one example this may be achieved through a suitable arrangement of multiple printheads. In other examples a single printhead having an array of nozzles having a length to enable them to span the width of the support member 204 may be used. In other examples, the agent distributors 202 and 206 may have a shorter length that does not enable them to span the whole width of the support member 204.

The agent distributors 202 and 206 are mounted on a moveable carriage to enable them to move bi-directionally across the length of the support 204 along the illustrated y-axis. This enables selective delivery of coalescing agent and cooling agent across the whole width and length of the support 204 in a single pass. In other examples the agent distributors 202 and 206 may be fixed, and the support member 204 may move relative to the agent distributors 202 and 206.

It should be noted that the term 'width' used herein is used to generally denote the shortest dimension in the plane parallel to the x and y axes illustrated in FIG. 2a, whilst the term 'length' used herein is used to generally denote the longest dimension in this plane. However, it will be understood that in other examples the term 'width' may be interchangeable with the term 'length'. For example, in other examples the agent distributors 202 and 206 may have a length that enables them to span the whole length of the support member 204 whilst the moveable carriage may move bi-directionally across the width of the support 204.

In another example the agent distributors 202 and 206 do not have a length that enables them to span the whole width of the support member but are additionally movable bi-directionally across the width of the support 204 in the illustrated x-axis. This configuration enables selective delivery of coalescing agent and cooling agent across the whole width and length of the support 204 using multiple passes. Other configurations, however, such as a page-wide array configuration, may enable three-dimensional objects to be created faster.

The coalescing agent distributor 202 may include a supply of coalescing agent or may be connectable to a separate supply of coalescing agent. The cooling agent distributor 206 may include a supply of cooling agent or may be connectable to a separate supply of cooling agent.

The system 200 further comprises a build material distributor 224 to provide, e.g. deliver and/or deposit, successive layers of build material on the support 204. Suitable build material distributors 224 may include, for example, a wiper blade and a roller. Build material may be supplied to the build material distributor 224 from a hopper or build material store. In the example shown the build material distributor 224 moves across the length (y-axis) of the support 204 to deposit a layer of build material. As previously described, a layer of build material will be deposited on the support 204, whereas subsequent layers of build material will be deposited on a previously deposited layer of build material. The build material distributor 224 may be a fixed part of the system 200, or may not be a fixed part of the system 200, instead being, for example, a part of a removable module.

In some examples, there may be additional coalescing agent distributors, cooling agent distributors, and build material distributors relative to the distributors shown in FIG. 2a. In some examples, the distributors of system 200 may be located on the same carriage, either adjacent to each other or separated by a short distance. In other examples, two or more carriages each may contain one or more distributors. For example, each distributor may be located in its own separate carriage.

In the example shown the support 204 is moveable in the z-axis such that as new layers of build material are deposited a predetermined gap is maintained between the surface of the most recently deposited layer of build material and lower surface of the agent distributors 202 and 206. In other examples, however, the support 204 may not be movable in the z-axis and the agent distributors 202 and 206 may be movable in the z-axis.

The system 200 may additionally include an energy source 226 to apply energy to build material to cause the solidification of portions of the build material according to where coalescing agent has been delivered or has penetrated. In some examples, the energy source 226 is an infra-red (IR) radiation source, near infra-red radiation source, halogen radiation source, or a light emitting diode. In some examples, the energy source 226 may be a single energy source that is able to uniformly apply energy to build material deposited on the support 204. In some examples, the energy source 226 may comprise an array of energy sources.

In some examples, the energy source 226 is configured to apply energy in a substantially uniform manner to the whole surface of a layer of build material. In these examples the energy source 226 may be said to be an unfocused energy source. In these examples, a whole layer may have energy applied thereto simultaneously, which may help increase the speed at which a three-dimensional object may be generated.

In other examples, the energy source 226 is configured to apply energy in a substantially uniform manner to a portion of the whole surface of a layer of build material. For example, the energy source 226 may be configured to apply energy to a strip of the whole surface of a layer of build material. In these examples the energy source may be moved or scanned across the layer of build material such that a substantially equal amount of energy is ultimately applied across the whole surface of a layer of build material.

In some examples, the energy source 226 may be mounted on the moveable carriage.

In other examples, the energy source 226 may apply a variable amount of energy as it is moved across the layer of build material. For example, the controller 210 may control the energy source only to apply energy to portions of build material on which coalescing agent has been applied.

In further examples, the energy source 226 may be a focused energy source, such as a laser beam. In this example the laser beam may be controlled to scan across the whole or a portion of a layer of build material. In these examples the laser beam may be controlled to scan across a layer of build material in accordance with agent delivery control data. For example, the laser beam may be controlled to apply energy to those portions of a layer of on which coalescing agent is delivered.

Figure 2B:
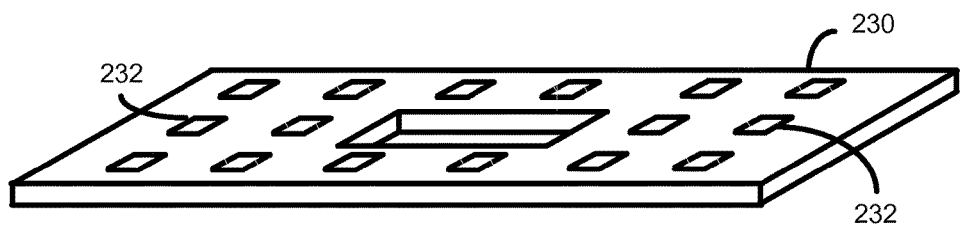
FIG. 2b is a simplified isometric illustration of a heater for an additive manufacturing system according to some examples.

The system 200 may additionally include a heater 230 to emit heat to maintain build material deposited on the support 204 within a predetermined temperature range. The heater 230 may have any suitable configuration. One example is shown in FIG. 2b, which is a simplified isometric illustration of a heater 230 for an additive manufacturing system according to some examples. The heater 230 may have an array of heating elements 232, as shown. The heating units 232 may be each be any suitable heating unit, for example a heat lamp such as an infra-red lamp. The heating units 232 may have a suitable shapes or configurations such as rectangular as shown in FIG. 2b. In other examples they may be circular, rod shaped, or bulb shaped, for example. The configuration may be optimized to provide a homogeneous heat distribution toward the area spanned by the build material. Each heating unit 232, or groups of heating units 232, may have an adjustable current or voltage supply to variably control the local energy density applied to the build material surface.

Each heating units 232 may correspond to its own respective area of the build material, such that each heating unit 232 may emit heat substantially toward its own area rather than areas covered by other heating units 232. For example, each of the sixteen heating units 232 in FIG. 2a may heat one of sixteen different areas of the build material, where the sixteen areas collectively cover the entire area of the build material. However, in some examples, each heating unit 232 may also emit, to a lesser extent, some heat which influences an adjacent area.

Use of a heater 230 may help reduce the amount of energy that has to be applied by the energy source 226 to cause coalescence and subsequent solidification of build material on which coalescing agent has been delivered or has penetrated.

The system 200 may additionally include a temperature sensor 228, for example a point contactless temperature sensor such as a one or more thermocouples or one or more thermopile, or such as a thermographic camera. The temperature sensor 228 may be to capture a temperature values or an image representing a radiation distribution emitted by each point of the build material across the area spanned by the build material on the support member 204. The temperature sensor 228 may output the radiation distribution to the controller 210, which may determine a temperature distribution across the build material based on known relationships, such as a blackbody distribution, between temperature and radiation intensity for the material used as the build material. For example, the radiation frequencies of the radiation distribution may have their highest intensities at particular values in the infra-red (IR) range. This may be used to determine the temperature distribution comprising a plurality of temperatures across the build material.

Although in FIG. 2a the energy source 226, heater 230, and thermographic camera 228 are shown in particular locations above the support member 204, they may each be placed in any suitable location above or around the support member 214.

The controller 210 may control delivery of agents in accordance with agent control delivery data 208. For example, the controller 210 may control the selective delivery of coalescing agent to a layer of provided build material in accordance with instructions comprising coalescing agent delivery control data. Additionally, the controller 210 may control the selective delivery of cooling agent to a layer of provided build material in accordance with instructions comprising cooling agent delivery control data. The controller 210 may also control the energy source 226 may apply a variable amount of energy as it is moved across the layer of build material, for example in accordance with agent delivery control data 208.

The agent delivery control data 208 may define for each slice of the three-dimensional object to be generated the portions or the locations on the build material, if any, at which at least one of coalescing agent and cooling agent is to be delivered.

The coalescing agent delivery control data may be derived, for example, by a suitable three-dimensional object processing system. In some examples the three-dimensional object processing system may be comprised within the additive manufacturing system 200. For example, the instructions 218 may additionally include instructions that, when executed by the processor 212, cause the processor 212 to operate as a three-dimensional object processing system as described herein. In other examples the three-dimensional object processing system may be external to the additive manufacturing system 400. For example, the three-dimensional object processing system may be a software application, or part of a software application, executable on a computing device separate from the system 200.

In some examples, the coalescing agent delivery control data may be generated based on object design data representing a three-dimensional model of an object to be generated, and/or from object design data representing properties of the object. The model may define the solid portions of the object, and may be processed by the three-dimensional object processing system to generate slices of parallel planes of the model. Each slice may define a portion of a respective layer of build material that is to be solidified by the additive manufacturing system. The object property data may define properties of the object such as density, surface roughness, strength, and the like.

The object design data and object property data may be received, for example, from a user via an input device 220, as input from a user, from a software driver, from a software application such as a computer aided design (CAD) application, or may be obtained from a memory storing default or user-defined object design data and object property data.

In some examples, the cooling agent delivery control data may, for example, be generated based on temperature feedback, thermal process models, as will be discussed at block 308.

In some examples the object processing system may obtain data relating to characteristics of the additive manufacturing system 200. Such characteristics may include, for example, build material layer thickness, properties of the coalescing agent, properties of the cooling agent, properties of the build material, and properties of the energy source 226, properties of the heater 230, and properties of the temperature sensor 228.

The agent delivery control data 208 may describe, for each layer of build material to be processed, locations or portions on the build material at which at least one of coalescing agent and cooling agent are to be delivered. In one example the locations or portions of the build material at which coalescing agent and cooling agent are to be delivered are defined by way of respective patterns. In some examples the object processing system may determine an order in which coalescing agent and cooling agent are to be delivered to build material, for example along with corresponding timing data that may, for example, define a time delay to respect between delivery of coalescing agent and cooling agent.

Depending on the characteristics described above, the density at which coalescing agent and cooling agent are to be delivered may be varied. For example, when a portion of build material on which coalescing agent has been delivered or has penetrated receives applied energy, the energy absorbed by those portions propagates to other surrounding areas. In one example, the properties of the coalescing agent and the amount of coalescing agent delivered may be chosen such that energy propagates in a sphere in the range of about 1.5 times the layer thickness. This may help ensure not only sufficient inter-layer bonding, but also sufficient bonding between laterally adjacent portions of build material. The density may also be varied to regulate temperature of the build material, as will be discussed in reference to block 310.

In this way, the object processing system may, for example, determine that the lateral spacing between adjacent drops of coalescing agent may be increased whilst still ensuring sufficient object strength. Doing so reduces the average density at which coalescing agent may be delivered to a layer of build material, and hence reduces consumption of coalescing agent, but without affecting the object strength.

In some examples, the agent delivery control data may define, for any portion of build material, whether cooling agent is to be delivered one, two, or all of before, during, and after coalescing agent.

In describing FIG. 3, reference will be made to FIGS. 2a-b, 4a-d, 5a-d, and 6a-d. FIGS. 4a-d show a series of cross-sectional side views of layers of build material according to some examples. FIGS. 5a-d show a series of top views of the layers of build material of FIGS. 4a-d according to some examples. FIGS. 6a-d show a series of schematic top views of temperature distributions in the layers of build material of FIGS. 4a-d according to some examples.

Figure 3:
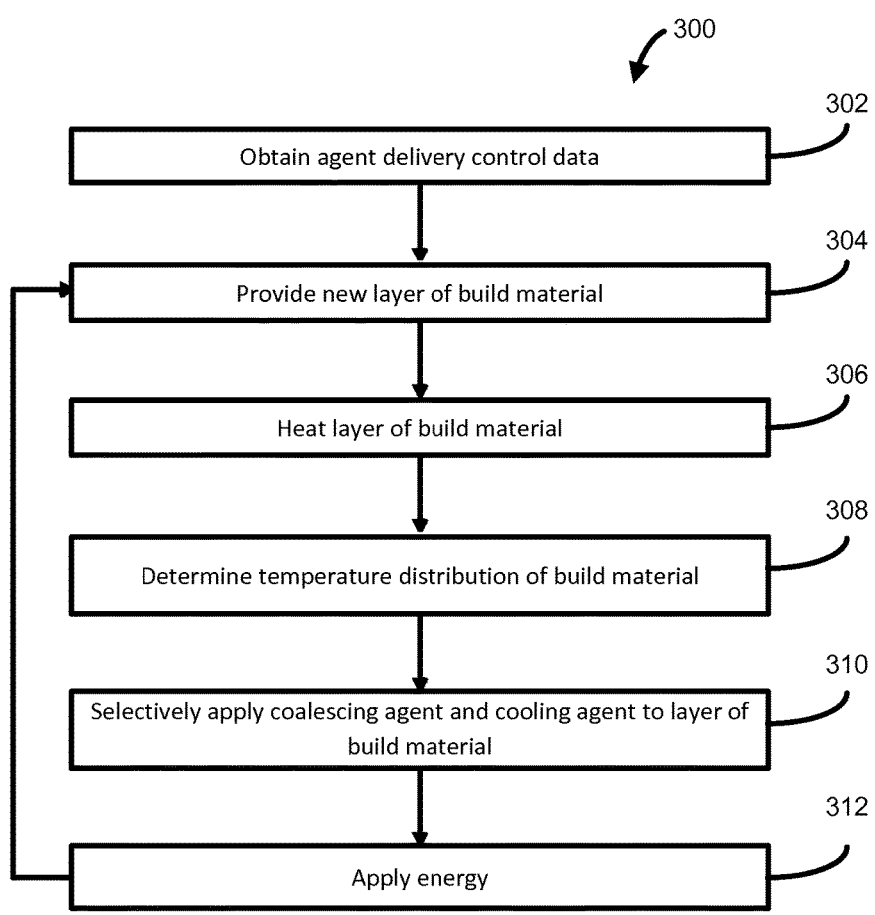
FIG. 3 is a flow diagram illustrating a method of three-dimensional object according to some examples.

FIG. 3 is a flow diagram illustrating a method 300 of generating a three-dimensional object according to some examples. The method may be computer implemented. In some examples, the orderings shown may be varied, such that some steps may occur simultaneously, some steps may be added, and some steps may be omitted.

At 302, the controller 210 may obtain agent delivery control data 208 such as the coalescing agent delivery control data.

At 304, a layer 402b of build material may be provided, as shown in FIGS. 4a and 5a. For example, the controller 210 may control the build material distributor 224 to provide the layer 402b on a previously completed layer 402a on the support member 204 by causing the build material distributor 224 to move along the y-axis as discussed earlier. The completed layer 402a may include a solidified portion 408. Although a completed layer 402a is shown in FIGS. 4a-d for illustrative purposes, it is understood that the steps 304 to 310 may initially be applied to generate the first layer 402a.

In some examples, the thickness of the layer 402b of build material provided may have a value selected from the range of between about 50 to about 300 microns, or about 90 to about 110 microns, or about 250 microns, although in other examples thinner or thicker layers of build material may be provided. The thickness may be controlled by the controller 210, for example based on the agent delivery control data 208.

At 306, the build material may be heated by the heater 230 to heat and/or maintain the build material within a predetermined temperature range. The predetermined temperature range may, for example, be below the temperature at which the build material would experience bonding in the presence of coalescing agent 404. For example, the predetermined temperature range may be between about 155 and about 160 degrees Celsius, or the range may be centered at about 160 degrees Celsius. Pre-heating may help reduce the amount of energy that has to be applied by the energy source 226 to cause coalescence and subsequent solidification of build material on which coalescing agent has been delivered or has penetrated. The heating may be uniformly applied based on an assumption that the build material may have a uniform baseline temperature, for example about 90 to about 100 degrees Celsius. Thus, the degree of heating will be provided to raise the uniform baseline temperature to the predetermined temperature range. However, in some examples, the build material may not actually have a uniform temperature at this stage. Thus, the build material may have an uneven temperature distribution that may lie outside the predetermined temperature range at one or more points of the build material.

At 308, a temperature distribution of the build material may be determined. For example, temperature sensor such as the thermographic camera 228 may obtain temperature feedback, for example by capturing an image representing a radiation distribution of the build material. The radiation distribution may be used by the controller 210 to determine a temperature distribution 500a of the build material, for example based on the methods discussed earlier. In the example of FIG. 6a, the region 502 may have the baseline temperature, and regions 506 may have respective temperatures greater than the baseline temperature. These non-uniformities may result from the coalescence and solidification of portions of the previous deposited layer, for example during energy application at block 312. The area where coalescing agent 406 had been delivered during the creation of the previous layer 402a may have a substantially greater than baseline temperature, as shown in FIG. 6a.

In some examples, rather than obtaining the temperature feedback, the controller 210 may generate the temperature distribution 500a based on a thermal process model which mathematically models heat diffusion based on the coalescing agent delivery control data. The model may involve solving the heat equation using finite element analysis, or may involve any other suitable method. In some examples, the controller 210 may have stored look-up tables defining heat diffusion characteristics of various three-dimensional objects. Thus, the controller 210 may match the agent delivery control data 208 with a suitable look-up table to generate the temperature distribution 500a.

In some examples, a combination of temperature feedback, thermal process models, and/or look up tables may be used.

Thus, the controller 210 may obtain agent control delivery data 208, such as cooling agent delivery control data, based on the determined temperature distribution 500*a* that was determined based on temperature feedback, thermal process models, or look up tables.

At 310, a coalescing agent 404 and a cooling agent 406 may be selectively delivered to one or more portions of the surface of the layer 402*b* of build material, as shown in FIGS. 4*b* and 5*b*. As discussed earlier, the agents 404 and 406 may be delivered by agent distributors 202 and 206, for example in the form of fluids such as liquid droplets.

The selective delivery of the coalescing agent 404 may be performed in a pattern on portions of the layer 402*b* that the agent delivery control data 208, such as the coalescing agent delivery control data, may define to become solid to form part of the three-dimensional object being generated. The selective delivery of the coalescing agent 406 may be performed in a pattern on portions of the layer 402*b* that the agent delivery control data 208, such as the cooling agent delivery control data, may define as portions which are to be reduced in temperature using the cooling agent.

"Selective delivery" means that coalescing agent and cooling agent may be delivered to selected portions of the surface layer of the build material in various patterns. The patterns may be defined by the agent delivery control data 208. The patterns of the agents 404 and 406 may be independent of each other meaning that the agents 404 and 406 may not be delivered, at each point of the build material, in a fixed proportion to each other.

In various examples, the controller 210 controls the coalescing agent distributor 202 to selectively deliver the coalescing agent 404 one or more of before, after, and during controlling the cooling agent distributor 202 or 206 to selectively deliver cooling agent 406. In any of these examples, different agent distributors 202 and 206 may be used to deliver respective agents 404 and 406. Additionally, in any of these examples, just one agent distributor 202 may be used such that, for example, (1) some nozzles in a printhead 202 may be used to deliver coalescing agent 404, and other nozzles in the same printhead 202 may be used to deliver cooling agent 406, (2) the coalescing agent 404 and cooling agent 406 may be prepared in a mixture or solution, such that at least some nozzles in a printhead 202 may deliver the mixture or solution, and/or (3) or the same nozzles may deliver different agents 404 and 406 at different times without the agents 404 and 406 being mixed.

The cooling agent 406 may be selectively delivered in portions of the layer 402*b* that the temperature distribution 500*a* indicates as having temperatures greater than the baseline temperature. The cooling agent 406 may, for example, have a temperature of about 20 to about 60 degrees Celsius, or about room temperature, or about 50 degrees Celsius, prior to delivery. In some examples, the temperature may be above room temperature in the range above, e.g. between about 40 to about 60 degrees Celsius, for example because the process of ejecting the cooling agent 406 may cause some degree of heating from room temperature. The cooling agent 406 may reduce temperature of build material at the portions where it is delivered. For example, an amount of and location of cooling agent 406 may be selectively delivered to transition to the temperature distribution 500*a* to a predetermined target temperature distribution, for example such that the regions 506 of FIG. 6*a* may be cooled to attain the same temperature of region 502. This may result in the uniform or substantially uniform temperature target temperature distribution 500*b* of FIG. 6*b* having the uniform or substantially region 502. In other examples, the target temperature distribution may instead be a custom non-uniform temperature distribution which may likewise achieve suitable reduction of deformations.

If cooling agent 406 is delivered to portions of the build material where coalescing agent 404 is not delivered, then build material on which the cooling agent 406 has been delivered may be prevented from reaching temperatures at or above the melting point of the build material. In some examples, to help reduce the effects of lateral coalescence bleed when energy is applied in block 312, the cooling agent 406 may be delivered in regions that are (1) high temperature, and (2) adjacent to where coalescing agent 404 is delivered. This may be used, for example, to improve the definition or accuracy of object edges or surfaces, and/or to reduce surface roughness. Thus, the cooling agent 406 may serve to reduce the degree of coalescence of a portion of build material on which the cooling agent 406 has been delivered or has penetrated.

If cooling agent 406 is delivered to portions of the build material where coalescing agent 404 is delivered, then the cooling agent 406 may not necessarily be intended to prevent melting, but instead may reduce undesired accumulation of heat in the build material.

In some examples, the cooling agent 406 has a boiling point less than the melting point of the build material, and less than temperature of the build material at time of delivery of the cooling agent 406. For example, the cooling agent 406 may be water with a boiling point of 100 degrees Celsius, and the temperature of the build material may be about 160 degrees Celsius. Thus, upon delivery, the cooling agent 406 may absorb heat from the portions of the build material on which the cooling agent 406 is delivered, causing the cooling agent 406 to exceed its boiling point and evaporate. This may cause the portions of the build material to be reduced in temperature.

In some examples, the cooling agent 406 has a boiling point greater than the present temperature of the build material. For example, the build material may have undergone insufficient or no pre-heating, such that its present temperature is below the boiling point of the cooling agent 406. Thus, the cooling agent 406 may evaporate by absorbing energy applied to the build material in block 312, which will be discussed, thereby cooling the build material.

In some examples, cooling agent 406 may also be applied to control mechanical properties, such as strength e.g. tensile strength, of the portions of the build material that are to be solidified. If there is a long time lag between delivery of cooling agent 406 and application of energy at block 312, then the cooling agent 406 may not exhibit any effect on the mechanical properties, for example because the cooling agent 406 may evaporate too quickly. However, if the time lag is shortened, then portions of the build material where coalescing agent 404 was delivered along with cooling agent 406 may exhibit greater strength, for example, than portions in which coalescing agent 404 was delivered but cooling agent was not delivered. This effect may be created because smaller thermal gradients may result in lower mechanical stress on the build material.

In some examples, coalescing agent 404 may also be delivered to raise temperatures, for example if there are any low temperature regions in the temperature distribution 500*a*, for example if the temperature is below the baseline temperature in region 502. The extra heating may be caused because the presence of coalescing agent 404 on the build material may cause the build material in regions having coalescing agent 404 to experience a greater heating in response to application of energy, such the application of energy provided at block 312. To achieve this effect, the amount and density of coalescing agent 404 to deliver may be controlled.

In some examples, extra coalescing agent 404 may be delivered for heating to portions of the build material which were already to receive coalescing agent 404 for coalescence and solidification. In such examples, the coalescing agent 404 may be delivered at a higher amount or density than if the delivery was solely for the purpose of coalescence.

In some examples, coalescing agent 404 may be delivered for heating in regions in which coalescence and solidification is not desired. In these examples, an amount or density of coalescing agent 404 may be delivered that is below a threshold amount or density of coalescing agent 404 needed to cause coalescence. However, the amount or density delivered may still be sufficient to cause heating of the build material in regions that the coalescing agent 404 is delivered In some examples, regulating the temperatures of the build material to reach a target distribution may involve combinations of (1) delivering, in regions to be cooled, cooling agent 406, and (2) delivering, in regions to be warmed, extra coalescing agent 404 beyond an amount or density desired for coalescence.

FIGS. 4c and 5c shows coalescing agent 404 having penetrated substantially completely into the layer 402b of build material, but in other examples, the degree of penetration may be less than 100%. The degree of penetration may depend, for example, on the quantity of agent delivered, on the nature of the build material, on the nature of the agent, etc. FIG. 6c shows that the build material may still have a substantially uniform temperature distribution 500c having the uniform region 502.

At 310, a predetermined level of energy may be temporarily applied to the layer 402b of build material. In various examples, the energy applied may be infra-red or near infra-red energy, microwave energy, ultra-violet (UV) light, halogen light, ultra-sonic energy, or the like. The length of time the energy is applied for, or energy exposure time, may be dependent, for example, on one or more of: characteristics of the energy source; characteristics of the build material; characteristics of the coalescing agent; and characteristics of the cooling agent. The type of energy source used may depend on one or more of: characteristics of the build material; characteristics of the coalescing agent; and characteristics of the cooling agent. In one example, the energy may be applied for a predetermined length of time.

The temporary application of energy may cause portions of the build material on which coalescing agent 404 has been delivered or has penetrated to heat up above the melting point of the build material and to coalesce. For example, the temperature of the layer 402b may achieve about 220 degrees Celsius. Upon cooling, the portions which have coalesced become solid and form part of the three-dimensional object being generated. As discussed earlier, one such portion 408 may have been generated in a previous iteration. The heat absorbed during the application of energy may propagate to the previously solidified portion 408 to cause part of portion 408 to heat up above its melting point. This effect helps creates a portion 410 that has strong interlayer bonding between adjacent layers of solidified build material, as shown in FIG. 4d.

Additionally, if delivered cooling agent 406 has yet to evaporate prior to application energy, for example if there was insufficient or no pre-heating, then the cooling agent 406 may evaporate by absorbing the applied energy to cool the build material. This may be because the energy applied may raise the temperature of the layer 402b to above the boiling point of the cooling agent 406.

Energy absorbed by build material on which coalescing agent 404 has been delivered or has penetrated may also propagate into surrounding build material and may be sufficient to cause surrounding build material to heat up. In the absence of cooling agent 406, this may cause, for example, heating of build material beyond its melting point, or may cause, for example, heating of build material below its melting point but to a temperature suitable to cause softening and bonding of build material. This may result in the subsequent solidification of portions of the build material that were not intended to be solidified and this effect is referred to herein as coalescence bleed, as discussed earlier. However, as discussed earlier, delivery of cooling agent 406 may serve to reduce coalescence bleed.

In some examples, the application of energy may cause new temperature non-uniformities to appear, as shown in temperature distribution 500d of FIG. 6d, including a regions 502 and 506 similar to those of FIG. 6a. Thus, during treatment of the subsequent layer, the hotter reasons 506 may be cooled.

In some examples, rather than delivering the cooling agent 406 before application of energy as discussed earlier, the cooling agent 406 may be delivered after application of energy. Because the application of energy may already have been applied, the temperature of portions of build material on which coalescing agent 404 was delivered may be at a high temperature such as 220 degrees Celsius, which may be higher than the boiling point of the cooling agent 406. Thus, upon delivery, the cooling agent 406 may absorb heat from the portions of the build material on which the cooling agent 406 is delivered, causing the cooling agent 406 to exceed its boiling point and evaporate. This may cause the portions of the build material to be reduced in temperature.

The combination of the energy supplied, the build material, and the coalescing agent 404 and cooling agent 406 may be selected such that, excluding the effects of any coalescence bleed: i) portions of the build material on which no coalescing agent 404 have been delivered do not coalesce when energy is temporarily applied thereto; ii) portions of the build material on which only coalescing agent 404 has been delivered or has penetrated coalesce when energy is temporarily applied thereto do coalesce; and iii) portions of the build material on which only cooling agent 406 has been delivered or has penetrated do not coalesce when energy is temporarily applied thereto.

Portions of the build material on which both coalescing agent 404 and cooling 406 agent have been delivered or have penetrated may or may not undergo coalescence, and may undergo a modified degree of coalescence. The degree of modification may depend, for example, on any one or more of the proportions of the coalescing agent and the cooling agent at any portion of build material; the patterns in which coalescing agent and/or cooling agent is delivered to build material; the chemical properties of the coalescing agent, cooling agent, and/or build material, the chemical interaction between the build material and the agents; and the interactions between the build material and agents whilst energy is applied. In some examples the degree of modification may be dependent on the order in which coalescing agent and cooling agent are delivered to the build material. In some examples the degree of modification may be dependent on the timing at which coalescing agent and cooling agent are delivered to build material.

After a layer of build material has been processed as described above, new layers of build material may be provided on top of the previously processed layer of build material. In this way, the previously processed layer of build material acts as a support for a subsequent layer of build material. The process of blocks 304 to 312 may then be repeated to generate a three-dimensional object layer by layer.

All of the features disclosed in this specification (including any accompanying claims, abstract and drawings), and/or all of the steps of any method or process so disclosed, may be combined in any combination, except combinations where at least some of such features and/or steps are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. An apparatus for generating a three-dimensional object, the apparatus comprising:
   an energy source to apply energy to a layer of build material to cause a first portion of the layer to coalesce and solidify;
   a first agent distributor to selectively deliver a coalescing agent onto the first portion of the layer of build material;
   a second agent distributor to selectively deliver a cooling agent onto a second portion of the layer of build material; and
   a controller to:
      control the energy source to apply energy to the layer to cause the first portion to coalesce and solidify;
      control the first agent distributor to selectively deliver the coalescing agent to the first portion of the layer of build material in a first pattern; and
      control the second agent distributor to selectively deliver the cooling agent onto the second portion of the layer in a second pattern, the first and second patterns being independent of each other;
   wherein the selective delivery of the cooling agent in the second pattern includes selecting portions to deliver the cooling agent from portions of the build material where the coalescing agent is not delivered, and delivering the cooling agent to the selected portions;
   and wherein the cooling agent delivered to portions of the build material where the coalescing agent is not delivered prevents the build material from coalescing in response to the application of energy.

2. The apparatus of claim 1 further comprising a temperature sensor to obtain temperature feedback representing a measured temperature distribution from the layer of build material prior to delivering the cooling agent, wherein the cooling agent is selectively delivered based on the measured temperature distribution.

3. The apparatus of claim 1 wherein the controller is to determine, prior to controlling the agent distributor to deliver the cooling agent, a temperature distribution of the layer of build material based on a thermal process model, wherein the controller is to control the agent distributor to selectively deliver the cooling agent based on the temperature distribution.

4. The apparatus of claim 1 wherein the controller is to determine, based on a temperature distribution of the build material prior to the selective delivery of the cooling agent, an amount of and location of the cooling agent to selectively deliver to achieve a target temperature distribution.

5. The apparatus of claim 1 wherein:
   the first agent distributor is to selectively deliver additional coalescing agent onto a third portion of the layer; and
   the controller is to control the first agent distributor to selectively deliver the coalescing agent onto the third portion of the layer to cause the third portion to warm when the energy is applied without causing coalescence of the third portion due to a combination of the additional coalescing agent and the build material.

6. The apparatus of claim 1 wherein the cooling agent comprises water.

7. The apparatus of claim 1 wherein the controller is to control the second agent distributor to selectively deliver the cooling agent before controlling the energy source to apply the energy.

8. The apparatus of claim 1 wherein the controller is to control the second agent distributor to selectively deliver the cooling agent after controlling the energy source to apply the energy.

9. A method of generating a three-dimensional object, the method comprising:
   selectively delivering a coalescing agent on a first portion of the layer of the build material in a first pattern;
   applying energy to a layer of delivered build material to cause the first portion of the layer to coalesce and solidify in the first pattern; and
   selectively delivering a cooling agent on a second portion of the layer of the build material to reduce a temperature of the second portion in a second pattern derived from data representing a measured temperature distribution from the layer or representing a temperature distribution predicted by a thermal process model;
   wherein the selective delivery of the cooling agent in the second pattern includes selecting portions to deliver the cooling agent from portions of the build material where the coalescing agent is not delivered and delivering the cooling agent to the selected portions;
   and wherein the cooling agent delivered to portions of the build material where the coalescing agent is not delivered prevents the build material from coalescing in response to the application of energy.

10. The method of claim 9 further comprising obtaining temperature feedback representing the measured temperature distribution from the layer of build material prior to delivering the cooling agent.

11. The method of claim 9 further comprising determining, prior to delivering the cooling agent, a temperature distribution of the layer of build material based on the temperature distribution predicted by the thermal process model.

12. The method of claim 9 further comprising selectively delivering the cooling agent to control mechanical properties of the build material where coalescence is desired.

13. A method of generating a three-dimensional object, the method comprising:
   delivering a layer of build material;
   selectively depositing coalescing agent to a first portion of the layer;
   applying energy to the layer to cause the first portion having the coalescing agent to coalesce and solidify in a first pattern; and
   selectively delivering a cooling liquid to a second portion of the layer to reduce a temperature of a second portion of the build material in a second pattern based on data representing a location to which the cooling liquid is to be selectively delivered;

wherein the first and second patterns are independent of each other;

wherein the selective delivery of the cooling agent in the second pattern includes selecting portions to deliver the cooling agent from portions of the build material where the coalescing agent is not delivered and delivering the cooling agent to the selected portions;

and wherein the cooling agent delivered to portions of the build material where the coalescing agent is not delivered prevents the build material from coalescing in response to the application of energy.

14. The method of claim 13 wherein the cooling agent delivered to portions of the build material where the coalescing agent has been delivered reduces a temperature of the build material without preventing the build material from coalescing in response to the application of energy.

15. The apparatus of claim 1 wherein the cooling agent delivered to portions of the build material where the coalescing agent has been delivered reduces a temperature of the build material without preventing the build material from coalescing in response to the application of energy.

16. The method of claim 9 wherein the cooling agent delivered to portions of the build material where the coalescing agent has been delivered reduces a temperature of the build material without preventing the build material from coalescing in response to the application of energy.

* * * * *